(12) United States Patent
Kang

(10) Patent No.: US 9,928,467 B2
(45) Date of Patent: Mar. 27, 2018

(54) APPARATUS FOR FORECASTING WATER DEMAND

(71) Applicant: LSIS CO., LTD., Anyang-si, Gyeonggi-do (KR)

(72) Inventor: Min Gu Kang, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 317 days.

(21) Appl. No.: 14/630,449

(22) Filed: Feb. 24, 2015

(65) Prior Publication Data
US 2015/0286950 A1    Oct. 8, 2015

(30) Foreign Application Priority Data
Apr. 8, 2014 (KR) .......................... 10-2014-0041853

(51) Int. Cl.
G06F 15/18 (2006.01)
G06N 99/00 (2010.01)

(52) U.S. Cl.
CPC .................................. G06N 99/005 (2013.01)

(58) Field of Classification Search
USPC .......................................................... 706/12
See application file for complete search history.

(56) References Cited

U.S. PATENT DOCUMENTS 8,151,603 B2 *  4/2012  Kang ...................... D06F 39/14
                                                        68/196
8,739,579 B2 *  6/2014  Son ........................ D06F 37/225
                                                        68/23.2
(Continued)

FOREIGN PATENT DOCUMENTS

CN     102592246 A   7/2012
JP     2005135287 A  5/2005
(Continued)

OTHER PUBLICATIONS

Benchmarking knowledge-assisted kriging for automated spatial interpolation of wind measurements Zlatko Zlatev; Stuart E. Middleton; Galina Veres 2010 13th International Conference on Information Fusion Year: 2010 pp. 1-8 IEEE Conference Publications.*

(Continued)

Primary Examiner — Michael B Holmes
(74) Attorney, Agent, or Firm — K&L Gates LLP

(57) ABSTRACT

There is provided an apparatus for forecasting water demand of a waste system using an automation system. The apparatus for estimating water demand includes a water demand estimation setting unit configured to collect user input data, a control unit configured to collect the record data and the user input data from the SCADA system, perform a learning process on each of a plurality of algorithm combination groups including at least one algorithm to select any one algorithm combination group, and input the record data and the user input data to the selected algorithm combination group to calculate water demand estimation data, a storage unit configured to store the record data collected from the SCADA system, store the user input data, and store the water demand estimation data, and a water demand estimation output unit configured to output the calculated water demand estimation data.

8 Claims, 3 Drawing Sheets

(56) References Cited

U.S. PATENT DOCUMENTS

| | | | | |
|---|---|---|---|---|
| 9,516,489 | B2* | 12/2016 | Kim | H04W 8/005 |
| 2012/0136496 | A1* | 5/2012 | Black | H02J 3/14 |
| | | | | 700/291 |
| 2013/0298983 | A1* | 11/2013 | Kim | C23F 13/20 |
| | | | | 136/256 |
| 2014/0346392 | A1* | 11/2014 | Yeon | H01M 4/505 |
| | | | | 252/182.1 |
| 2015/0014236 | A1* | 1/2015 | Kerr | C02F 9/005 |
| | | | | 210/293 |
| 2015/0245194 | A1* | 8/2015 | Kim | H04W 8/005 |
| | | | | 455/41.1 |
| 2015/0260151 | A1* | 9/2015 | Kang | F03B 15/16 |
| | | | | 700/282 |
| 2015/0286950 | A1* | 10/2015 | Kang | G06N 99/005 |
| | | | | 706/12 |
| 2016/0044269 | A1* | 2/2016 | Kang | H04W 4/008 |
| | | | | 348/552 |
| 2016/0103452 | A1* | 4/2016 | Kang | G05D 7/0635 |
| | | | | 700/282 |
| 2016/0357195 | A1* | 12/2016 | Kang | G05D 7/0676 |
| 2017/0158509 | A1* | 6/2017 | Kang | C01B 25/30 |
| 2017/0249355 | A1* | 8/2017 | Kang | G06F 17/30395 |

FOREIGN PATENT DOCUMENTS

| | | |
|---|---|---|
| KR | 1020050051488 | 6/2005 |
| KR | 20130109860 A | 10/2013 |

OTHER PUBLICATIONS

An Optimistic Calibration Numerical Method for Water Quality Model Parameters with COD Mingchang Li; Bin Zhou; Shuxiu Liang; Zhaochen Sun 2010 4th International Conference on Bioinformatics and Biomedical Engineering Year: 2010 pp. 1-4 IEEE Conference Publications.*

Thermal properties of materials and their characterization by classic and transient methods V. Boháč 2017 11th International Conference on Measurement Year: 2017 pp. 53-62 IEEE Conference Publications.*

Analyzing the marine traffic condition for estimating the high risk areas in the emergency evacuation Gen Fukuda; Kyoko Takashima 2015 International Association of Institutes of Navigation World Congress (IAIN) Year: 2015 pp. 1-6 IEEE Conference Publications.*

Energy efficiency, rationalization of energy and water consumption in popular houses Leandro Kazuaki Tsuruda; Luann Rodrigues; Dayane Martins Salles; Aylton Jose Alves; Wesley Pacheco Calixto; Luiza Rodrigues Vitor; Marcel Bruno Silveira e Souza 2017 18th International Scientific Conference on Electric Power Engineering (EPE) pp. 1-6 IEEE.*

Generalized Minimum Variance Control for Water Distribution System Magno Jose Gomes Silva; Clivaldo Silva Araujo; Saulo Tarso Marques Bezerra; Cicero Rocha Souto; Simplicio Arnaud Silva; Heber Pimentel Gomes IEEE Latin America Transactions Year: 2015, vol. 13, Issue: 3 pp. 651-658 IEEE Journals & Magazines.*

Reliability evaluation of generation systems with solar power Saeed Samadi; Chanan Singh 2014 International Conference on Probabilistic Methods Applied to Power Systems (PMAPS) Year: 2014 pp. 1-6 IEEE Conferences.*

A novel approach to prevent grid collapsing based on frequency estimation with increased user visibility Robin K Justine; S. Sofana Reka 2014 IEEE 2nd International Conference on Electrical Energy Systems (ICEES) Year: 2014 pp. 135-140 IEEE Conferences.*

Chinese Office Action for related Chinese Application No. 201510163409.X; Action dated Jul. 17, 2017; (10 pages).

Korean Office Action for related Korean Application No. 10-2014-0041853; action dated Jan. 6, 2016; (4 pages).

Mr. Myung-Hin Ryu, et al.; "1. Development of Optimization Technology for Water Distribution System"; Jan. 2004; (583 pages) (only first page submitted).

Suiqing Liu, et al; "Proceedings of Modern Theory of Water Supply Network and Engineering Technology"; China Architecture & Building Press; Nov. 30, 2007; pp. 22-29; (13 pages).

Tieyan Zhang, et al; "Proceedings of Electric Power System and Automation on the 20th Anniversary of Annual Academic Conference for China Higher Education Institutions"; Zhengzhou University Press; Oct. 31, 2004; pp. 1409-1411 (11 pages).

Suiqing Liu, et al; "Proceedings of Modern Theory of Water Supply Network and Engineering Technology"; article and English translation; China Architecture & Building Press; Nov. 30, 2007; pp. 22-29; (16 pages).

Suiqing Liu, et al; "Proceedings of Modern Theory of Water Supply Network and Engineering Technology"; China Architecture & Building Press; Nov. 30, 2007; pp. 22-29; (16 pages).

* cited by examiner

[Fig. 1]
Prior art
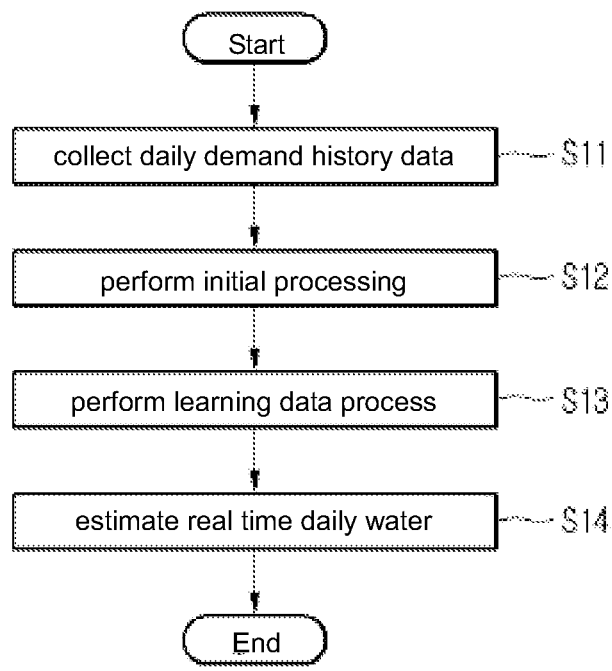
[Fig. 2]
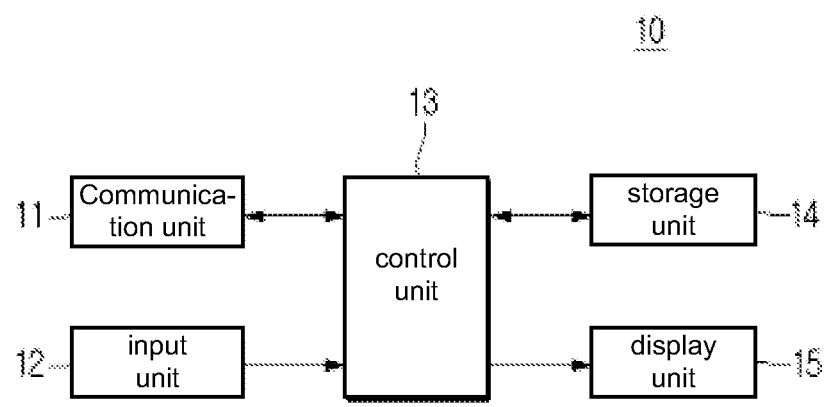

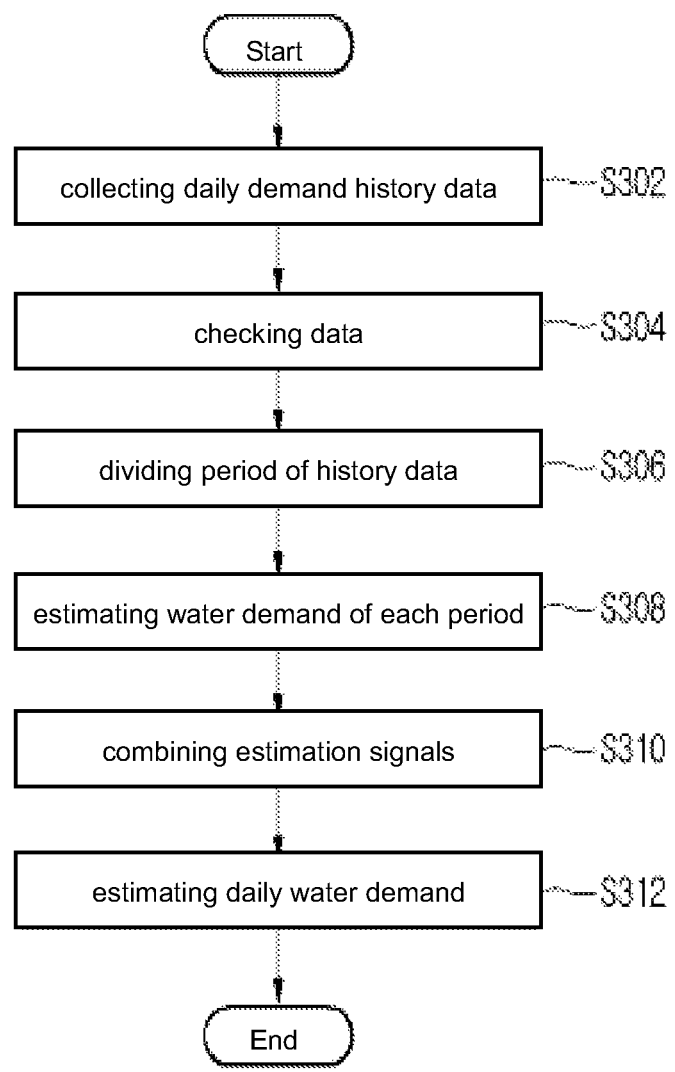
[Fig. 3]

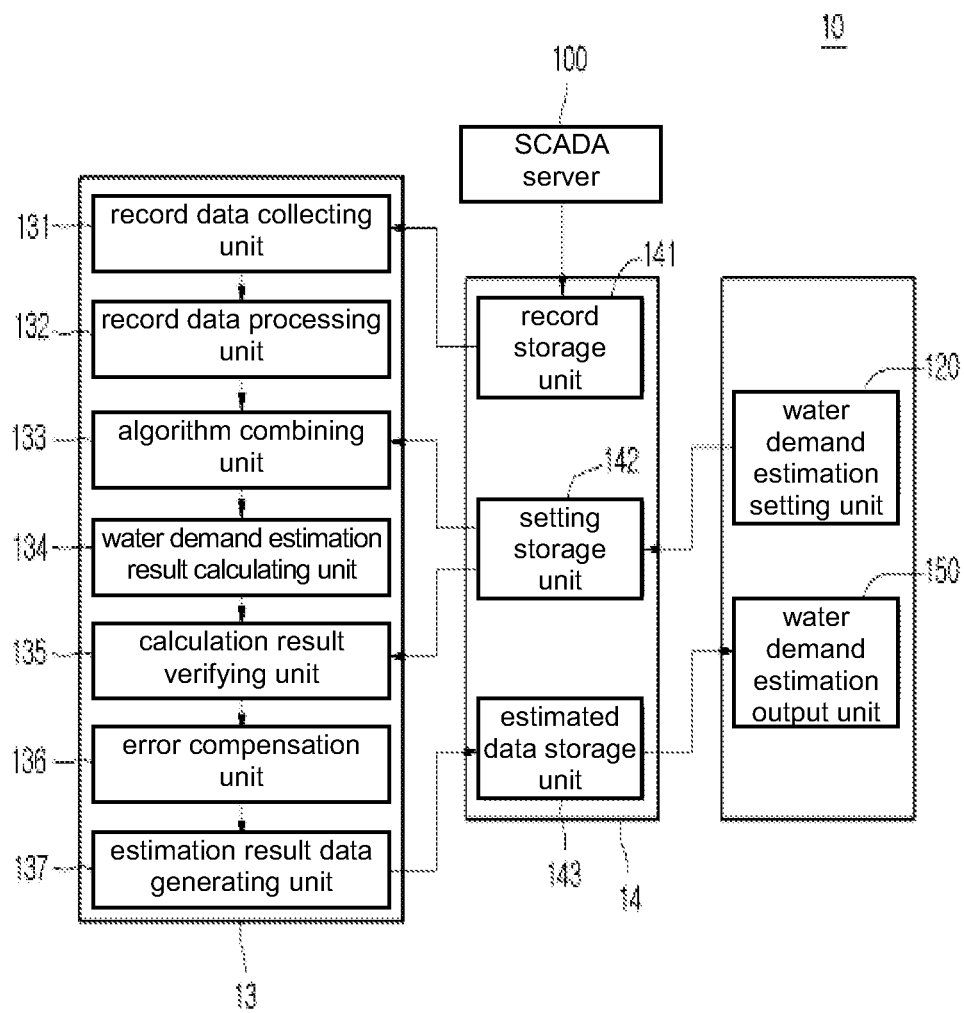
[Fig. 4]

APPARATUS FOR FORECASTING WATER DEMAND

CROSS-REFERENCE TO RELATED APPLICATION

Pursuant to 35 U.S.C. § 119(a), this application claims the benefit of earlier filing date and right of priority to Korean Application No. 10-2014-0041853 filed on Apr. 8, 2014, the contents of which is incorporated by reference herein in its entirety.

BACKGROUND OF THE INVENTION

1. Field of the Invention

The present disclosure relates to an apparatus for forecasting water demand of a waste system using an automation system.

2. Background of the Invention

Accurately estimating an amount of water demand in a water treatment system installed in a water distribution reservoir (or a service reservoir), a pure water reservoir, and the like, is a primary factor considered to be the most important in water operation and management, and a water management plan is established according to the estimation results.

In a related art water demand estimating technique of a water treatment system, daily water demand is estimated by simply linearizing daily water demand in a time series manner.

FIG. 1 is a flow chart illustrating an operation for estimating water demand according to the related art.

Referring to FIG. 1, the related art water demand estimating apparatus accesses a database of a host server to collect daily water demand history data for estimating daily water demand of waterworks (or a water supply service) in step S11.

With the collected daily water demand history data, the water demand estimating apparatus may perform an initial process in which the water demand estimating apparatus may search for error data, missing data, and the like, and corrects the searched error data and missing data and convert the corrected data into daily water demand estimate data such that the error data and missing data can be used again as previous average values in step S12.

The water demand estimating apparatus may apply the initially processed daily water demand history data to a certain preset model (a neural network model, a time series model, and the like) to perform a learning data process in step S13.

The water demand estimating apparatus may estimate daily water demand in real time by using the result obtained by performing the learning data process in step S14.

As described above, in the related art daily water demand estimation, the water demand in a time series regarding estimation of demand of water supplied through a water pipe network is not linear and complicated, but, since daily water demand is estimated by using a unit time series such as an artificial intelligence scheme of a neural network or a statistical scheme of a time series module, accuracy of prediction of daily water demand is low.

Thus, since water demand is estimated without consideration of various problems of the on-site characteristics and data acquirement, the estimated water demand may be significantly different from substantial water demand.

SUMMARY OF THE INVENTION

Therefore, an aspect of the detailed description is to provide an apparatus for forecasting water demand capable of accurately estimating water demand by hour to maximize water demand control efficiency, and a method thereof.

To achieve these and other advantages and in accordance with the purpose of this specification, as embodied and broadly described herein, an apparatus for estimating water demand may include: a water demand estimation setting unit configured to collect user input data; a control unit configured to collect the record data and the user input data from the SCADA system, set an upper limit value and a lower limit value among the data collected, compare a value with the upper limit value and the lower limit value to extract a value (normal data) present within the limit value range, set the extracted normal data as water demand estimation data, perform a learning process on each of a plurality of algorithm combination groups including at least one algorithm to select any one algorithm combination group, and input the record data and the user input data to the selected algorithm combination group to calculate water demand estimation data; a storage unit configured to store the record data collected from the SCADA system, store the user input data, and store the water demand estimation data; and a water demand estimation output unit configured to output the calculated water demand estimation data.

Also, the control unit may includes a record data collecting unit configured to collect the record data from the SCADA system; a record data processing unit configured to set an upper limit value and a lower limit value among the data collected, compare a value with the upper limit value and the lower limit value to extract a value (normal data) present within the limit value range, and set the extracted normal data as water demand estimation data by the record data collecting unit; an algorithm combining unit configured to generate a plurality of algorithm combination groups including at least one algorithm and select any one algorithm combination group among the generated algorithm combination groups; and a water demand estimation result calculating unit configured to calculate water demand estimation data by inputting the record data and the user data to the selected algorithm combination group.

Also, the algorithm combining unit may set the number of algorithms to be included in at least one algorithm combination group, performs a learning process on each of the algorithm combination groups including algorithms combined according to the number, and extracts any one algorithm combination group.

Also, the algorithm combining unit may give a weighted value of each algorithm according to the learning process performed on each of the combined algorithm groups, and extracts an algorithm combination having the uppermost weight value or an algorithm combination having the smallest error value with respect to reference estimation result data.

Also, the control unit may further include a calculation result verifying unit configured to verify the result calculated by the water demand estimation result calculating unit.

Also, the control unit may further include an error compensating unit configured to give a weighted value to water demand estimation data within a threshold range period from the current time, among the water demand estimation data calculated by the water demand estimation result calculating unit, and compensate an error with respect to hourly estimation result data.

Also, the storage unit may include a record storage unit configured to store record data collected from the SCADA server; a setting storage unit configured to store user input data; and an estimation data storage unit configured to store calculated water demand estimation data under the control of the control unit.

Also, the record storage unit may collect record data periodically from the SCADA server or outputs data collected in real time to the control unit periodically.

According to the apparatus and method for estimating water demand according to the exemplary embodiments of the present disclosure, since water demand is estimated by time (or hourly water demand is estimated) by applying various environmental factors and time factors, an amount of water corresponding to demand may be effectively executed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a flow chart illustrating an operation of estimating water demand according to the related art.

FIG. 2 is a block diagram of an apparatus for estimating water demand according to an embodiment of the present invention.

FIG. 3 is a flow chart illustrating an operation of estimating water demand according to an embodiment of the present invention.

FIG. 4 is a detailed block diagram illustrating an operation of estimating a water demand according to an embodiment of the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

FIG. 2 is a block diagram of an apparatus for estimating water demand according to an embodiment of the present invention.

Referring to FIG. 2, an apparatus for estimating water demand according to an embodiment of the present invention may include a communication unit 11, an input unit 12, a control unit 13, a storage unit 14, and a display unit 15.

The communication unit 11 may perform communication with a host sever (not shown) to receive history data of daily water demand from a database provided in the host server.

The input unit 12 may receive an operation command according to an operation of an operator. The input unit 12 may be a device for various types of user inputs.

The control unit 13 may control the communication unit 11 to perform communication according to an operation command of the user input through the input unit 12 to receive history data of daily water demand from the database provided in the host server. The control unit 13 may estimate daily water demand with the received history data of daily water demand, and provide control to output the estimated daily water demand and provide the same to the operator.

The storage unit 14 may store an operation program of the control unit 13 or store operation data operated under the control of the control unit 13.

The display unit 15 may output result data of an estimate operation state of daily water demand and estimated daily water demand under the control of the control unit 13.

An operation of estimating water demand according to an embodiment of the present invention will be described with reference to FIG. 3 on the basis of the foregoing configuration.

FIG. 3 is a flow chart illustrating an operation of estimating water demand according to an embodiment of the present invention.

Referring to FIG. 3, the control unit 13 of the apparatus for estimating water demand according to an embodiment of the present invention may perform communication with the host server through the communication unit 11 to collect daily water demand history data stored in the database of the host server in step S302.

The control unit 13 may perform an operation of checking data with respect to the collected daily water demand history data in step S304. The data checking may be an operation of searching for error data or missing data with respect to the collected daily water demand history data, and correcting the searched error data and missing data.

When the initial processing on the daily water demand history data is completed, the control unit 13 may perform a period dividing process on the daily water demand history data in step S306.

During the period dividing process, the daily water demand history data which is nonlinear and complicated may be divided into a predetermined period. For example, a wavelet function may be used as an example of a function for the period dividing process.

When the period dividing operation performed on the daily water demand history data is completed, the control unit 13 may perform estimation of water demand of each divided period in step S308. That is, for example, the control unit 13 may execute estimation of water demand of each period by using a support vector machine (SVM) model, a nonlinear time-series estimation model.

When water demand of each period is estimated, the control unit 13 combines the signals of the estimated water demand of each period in step S310 to estimate a final daily water demand and output the same in step S312.

The operation of estimating a daily water demand according to an exemplary embodiment of the present disclosure will be described in detail on the basis of a detailed configuration of the apparatus for forecasting water demand illustrated in FIG. 4.

FIG. 4 is a detailed block diagram illustrating an operation of estimating a water demand according to an embodiment of the present invention.

Referring to FIG. 4, the apparatus 10 for estimating water demand according to an exemplary embodiment of the present disclosure may include a water demand estimation setting unit 120, and the water demand estimation setting unit 120 may receive a preset value for estimating water demand from an operator. The received preset value may be stored in a setting storage unit 142 of the storage unit 14.

The storage unit 14 may include a record (result or performance) storage unit 141, a setting storage unit 142, and an estimated data storage unit 143.

The record storage unit 141 may periodically store record data required for estimation, received from the server. The record data may be periodically collected, or data collected in real time may be temporarily stored and may be stored in the record storage unit 141 at every predetermined period.

The setting storage unit 142 may store a user set value input through the water demand estimation setting unit 120.

The estimated data storage unit 143 may store data estimated according an exemplary embodiment of the present disclosure.

The control unit 13 may include a record data collecting unit 131, a record data processing unit 132, an algorithm combining unit 133, a water demand estimation result calculating unit 134, a calculation result verifying unit 135, an error compensation unit 136, and an estimation result data generating unit 137.

The record data collecting unit 131 may read data stored in the record storage unit 141 and output the read data to the record data processing unit 132. The record data collecting unit 131 may dynamically collect data at every predetermined time intervals according to a period (daily, hourly) of the record data.

The record data processing unit 132 may calculate an upper limit value and a lower limit value through analysis of record data measurement value on the basis of data collected by the record data collecting unit 131, and register the calculated upper limit value and the lower limit value. Also, the record data processing unit 132 may compare a value with the upper limit value and the lower limit value and extract a value (BAD) (abnormal data) out of a limit value range between the upper limit value and the lower limit value and a value (GOOD) (normal data) present within the limit value range between the upper limit value and the lower limit value. Among the extracted values, only a value (GOOD) present within the limit value range may be used as data for estimating water demand.

The algorithm combining unit 133 may perform or stop water demand estimation according to whether a flag value is changed on the basis of a value previously set through the water demand estimation setting unit 120.

The algorithm combining unit 133 may configure an algorithm for estimating wafer demand as a sub module, and the sub module may determine an algorithm to be used according to a manual mode flag and an automatic mode flag. In the manual mode, the algorithm combining unit 133 may select one water demand algorithm according to a user selection and perform the selected water demand algorithm, and in the automatic mode, the algorithm combining unit 133 combines 1 to N number of water demand estimation algorithms (ensemble algorithm) and performs the same. As for the combination of algorithms (ensemble algorithm), the number of algorithm combinations may be determined in advance and a learning process may be performed on each of the combined cases to produce a result. Here, an optimal algorithm combination may be generated.

Namely, according to the result produced through the learning process performed in each of the combined algorithm groups, a weighted value is given to each algorithm used for each combination, and a combination of algorithms having high weighted values or a combination of algorithms which has a less error with respect to the reference estimation result data, may be generated as an optimal algorithm combination.

The water demand estimation result calculating unit 134 may calculate water demand estimation data through the algorithms combined and calculated by the algorithm combining unit 133. The water demand estimation result calculating unit 134 may input the record data and user data to a selected algorithm combination to calculate water demand estimation data.

The calculation result verifying unit 135 may verify the result calculated by the water demand estimation result calculating unit 134. The verified water demand estimation result may be recalculated by a separate test module set or a different algorithm combination.

In case of a real water demand estimation, the error compensating unit 136 may perform hourly water demand estimation, and here, as a time difference between the current time and a future estimation time is significant, an estimation error may increase. Thus, an error of data equal to or greater than a predetermined time, starting from the current time, may be compensated by reflecting a daily amount estimation result as a weighted value of a time amount estimation result. Namely, as for the water demand estimation data calculated by the water demand estimation result calculating unit 134, the error compensating unit 135 may compensate for an error in preparation for time amount estimation result data by reflecting a weighted value in the water demand estimation data within a threshold range period.

The estimation result data generating unit 137 may generate the estimated error-compensated water demand estimation data, as output data to be output.

In a method for estimating water demand according to an exemplary embodiment of the present disclosure on the basis of the foregoing configuration, water demand may be estimated on the basis of the preset value input through the water demand estimation setting unit 120 and normal data present within the limit value range of the record data periodically collected from an SCADA system. The algorithm combining unit 133 configures algorithms for water demand estimation as sub-units, and a group of algorithm combinations including at least one algorithm, and executes an algorithm using the data as an input value in each of the algorithm combination group. A daily water demand estimation value may be generated by using an algorithm combination having a less difference from the preset reference estimation result data according to the execution result.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for estimating water demand, the apparatus comprising:
   an estimation unit configured to obtain a preset value input by a user;
   a control unit configured to:
      obtain record data in response to a user request;
      set a limit value range of the obtained record data having an upper limit and a lower limit;
      compare a value of the obtained record data with the upper limit and lower limit in order to extract normal data from the obtained record data within the set limit value range;
      set the extracted normal data as water demand estimation data;
      perform a learning process on each of a plurality of algorithm combination groups including at least one algorithm in order to select one of the plurality of algorithm combination groups; and
      calculate water demand estimation data by inputting the obtained record data and preset value to the selected one of the plurality of algorithm combination groups;
   a storage unit configured to store the obtained record data, the obtained preset value, and the calculated water demand estimation data; and
   an output unit configured to output the calculated water demand estimation data,
   wherein the control unit is further configured to:
   divide the obtained record data into a plurality of periods;
   estimate water demand of each of the plurality of periods; and
   estimate final water demand by combining the estimated water demand of each of the plurality of periods.

2. The apparatus of claim 1, wherein the control unit includes:
   a data collecting unit configured to obtain the record data from a SCADA system;
   a data processing unit configured to set the limit value range, to compare the value of the obtained record data with the upper limit and the lower limit and extract the normal data, and to set the extracted normal data as the water demand estimation data;
   a combining unit configured to generate the plurality of algorithm combination groups and select the one of the plurality of algorithm combination groups; and
   a calculating unit configured to calculate the water demand estimation data.

3. The apparatus of claim 2, wherein the combining unit is further configured to:
   set a number of algorithms to be included in at least one of the plurality of algorithm combination groups;
   perform the learning process on each of the plurality of algorithm combination groups including algorithms combined according to the set number; and
   extract one of the plurality of algorithm combination groups.

4. The apparatus of claim 3, wherein the combining unit is further configured to:
   assign a weighted value of each of the algorithms according to the learning process; and
   extract an algorithm combination having an uppermost weight value or an algorithm combination having a smallest error value with respect to reference estimation data.

5. The apparatus of claim 2, wherein the control unit further includes a verifying unit configured to verify the calculated water demand estimation data.

6. The apparatus of claim 2, wherein the control unit further includes:
   a compensating unit configured to assign a weighted value to the calculated water demand estimation data within a threshold range period from a current time; and
   compensate an error related to hourly estimation result data.

7. The apparatus of claim 1, wherein the storage unit includes:
   a record storage unit configured to store obtained data;
   a setting storage unit configured to store obtained preset value; and
   an estimation data storage unit configured to store the calculated water demand estimation data.

8. The apparatus of claim 7, wherein the control unit obtains the data periodically from a SCADA server or periodically obtains data collected in real time as the record data.

* * * * *